(12) United States Patent
Fujita et al.

(10) Patent No.: US 6,497,041 B2
(45) Date of Patent: Dec. 24, 2002

(54) METHOD OF PRODUCING RESIN GEAR

(75) Inventors: Hiroshi Fujita, Tochigi (JP); Yoshitaka Tsuboi, Tochigi (JP)

(73) Assignee: Showa Corporation, JPX ( * ) Notice: Subject to any disclaimer, the term of this patent is extended or adjusted under 35 U.S.C. 154(b) by 27 days.

(21) Appl. No.: 09/793,286

(22) Filed: Feb. 26, 2001

(65) Prior Publication Data

US 2001/0039730 A1 Nov. 15, 2001

(30) Foreign Application Priority Data

May 9, 2000 (JP) ........................................ 2000-136327

(51) Int. Cl.[7] ................................................. B23P 15/14
(52) U.S. Cl. ........................ 29/893.35; 74/411; 74/425; 74/461; 74/388 PS; 74/DIG. 10; 264/138; 264/161

(58) Field of Search .............................. 29/893.35, 893; 264/138, 161, 167; 74/411, 425, 461, 388 PS, DIG. 10

(56) References Cited

U.S. PATENT DOCUMENTS 3,530,735 A * 9/1970 Alllen ...................... 29/893.35

FOREIGN PATENT DOCUMENTS

JP 8145146 4/1996

* cited by examiner

*Primary Examiner*—P. W. Echols
(74) *Attorney, Agent, or Firm*—Orum & Roth

(57) ABSTRACT

In a method of producing a resin gear, after applying a gear cutting having a gear cutting direction toward the gate forming portion onto an outer periphery surface of a resin rim layer, the gate forming portion is cut and removed.

2 Claims, 6 Drawing Sheets

F I G. 2
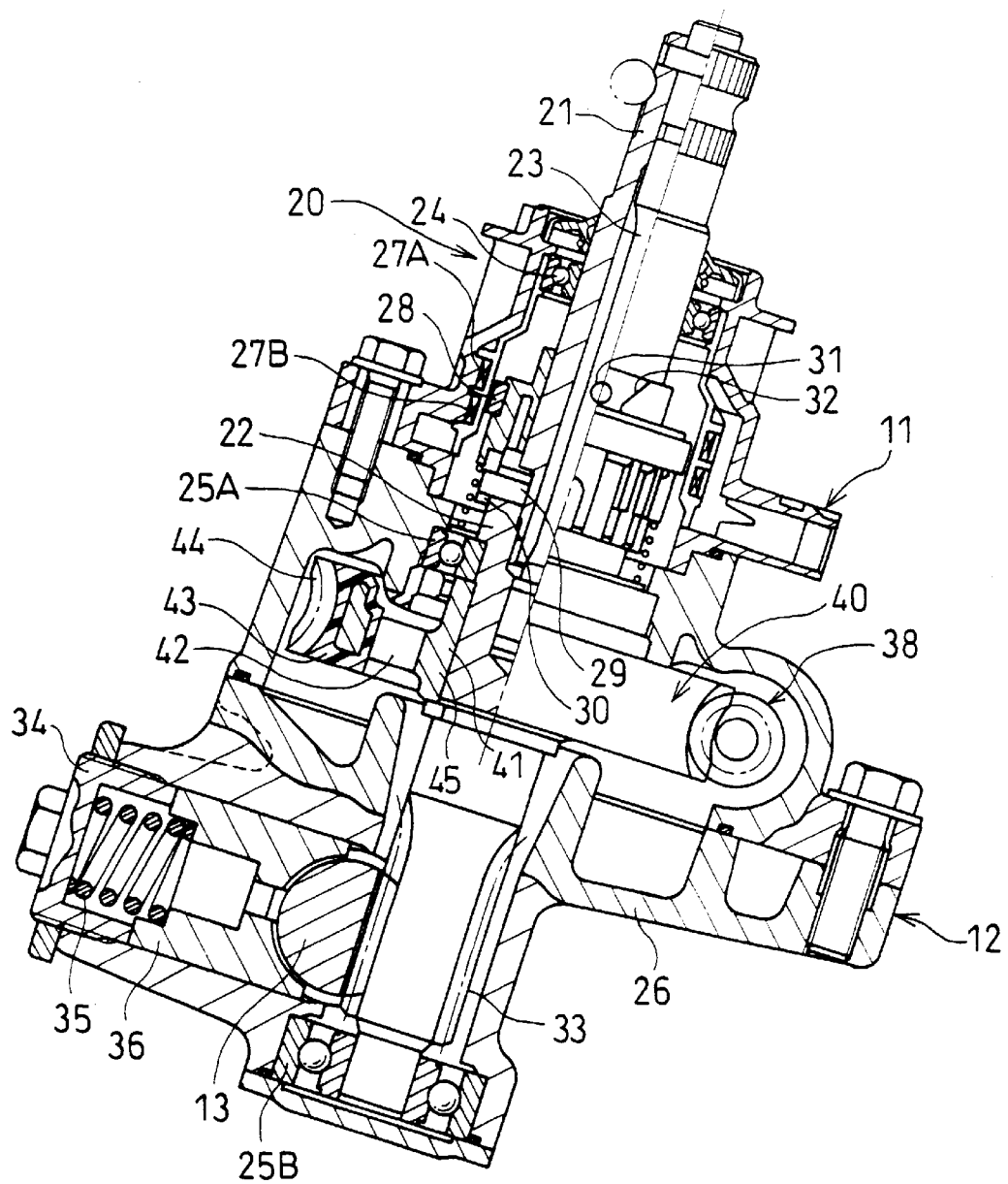

METHOD OF PRODUCING RESIN GEAR

BACKGROUND OF THE INVENTION

1. Field of the Invention

The present invention relates to a method of producing a resin gear which is preferably used in a high load transmission system such as a power steering apparatus or the like.

2. Description of the Related Art

In conventional use, in order to assist steering force by an electric power steering apparatus, a worm wheel for transmitting drive force of a motor to the steering shaft is employed in a transmission system for transmitting drive force of a motor to the steering shaft.

As the worm wheel employed for the high load transmission system such as the power steering apparatus or the like, it is considered that a boss and an arm are constituted by an insert metal fitting for strength. A rim having teeth is constituted by a resin to silence the engaging sound.

In accordance with the conventional art, as described in Japanese Patent Application Laid-Open Publication (JP-A) No. 8-145146, a resin rim layer is formed on an outer periphery of an insert metal fitting from a gate of a metal mold. A gear cutting is applied to the outer peripheral surface of the resin rim layer so as to obtain a gear.

However, in accordance with the conventional art, after obtaining a blank material in which a gate forming portion is cut and removed from a product which is formed from a resin rim layer on an outer periphery of an insert metal fitting, a gear cutting is applied onto an outer peripheral surface of the resin rim layer of the blank material. Accordingly, it is necessary to remove burrs generated on the outer peripheral surface of the resin rim layer due to the gear cutting after applying the gear cutting.

SUMMARY OF THE INVENTION

An object of the present invention is to reduce a number of steps for producing a resin gear so as to reduce cost.

In accordance with the present invention, there is provided a method of producing a resin gear in which a resin rim layer is formed on an outer periphery of an insert metal fitting from a gate of a metal mold and a gear cutting is applied onto an outer peripheral surface of the rim layer so as to form a gear, comprising the steps of:

forming a gate forming portion on a side surface in a gate side of the resin rim layer and to at least an outer peripheral surface side;

applying a gear cutting having a gear cutting direction toward a side of the gate forming portion onto an outer periphery surface of the resin rim layer; and thereafter cutting and removing the gate forming portion.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

FIG. 2 is a cross sectional view along a line II—II in FIG. 1;

FIGS. 3A and 3B show a worm wheel, in which FIG. 3A is a front elevational view and FIG. 3B is a cross sectional view;

FIGS. 8A and 8B show a gate cutting and removing step, in which FIG. 8A is a cross sectional view showing a state before cutting and FIG. 8B is a perspective view showing a state after cutting.

DESCRIPTION OF THE PREFERRED EMBODIMENTS

The present embodiment corresponds to a structure obtained by applying the present invention to producing a worm wheel 40 used in a steering assist of an electric power steering apparatus 10.

Figure 1:
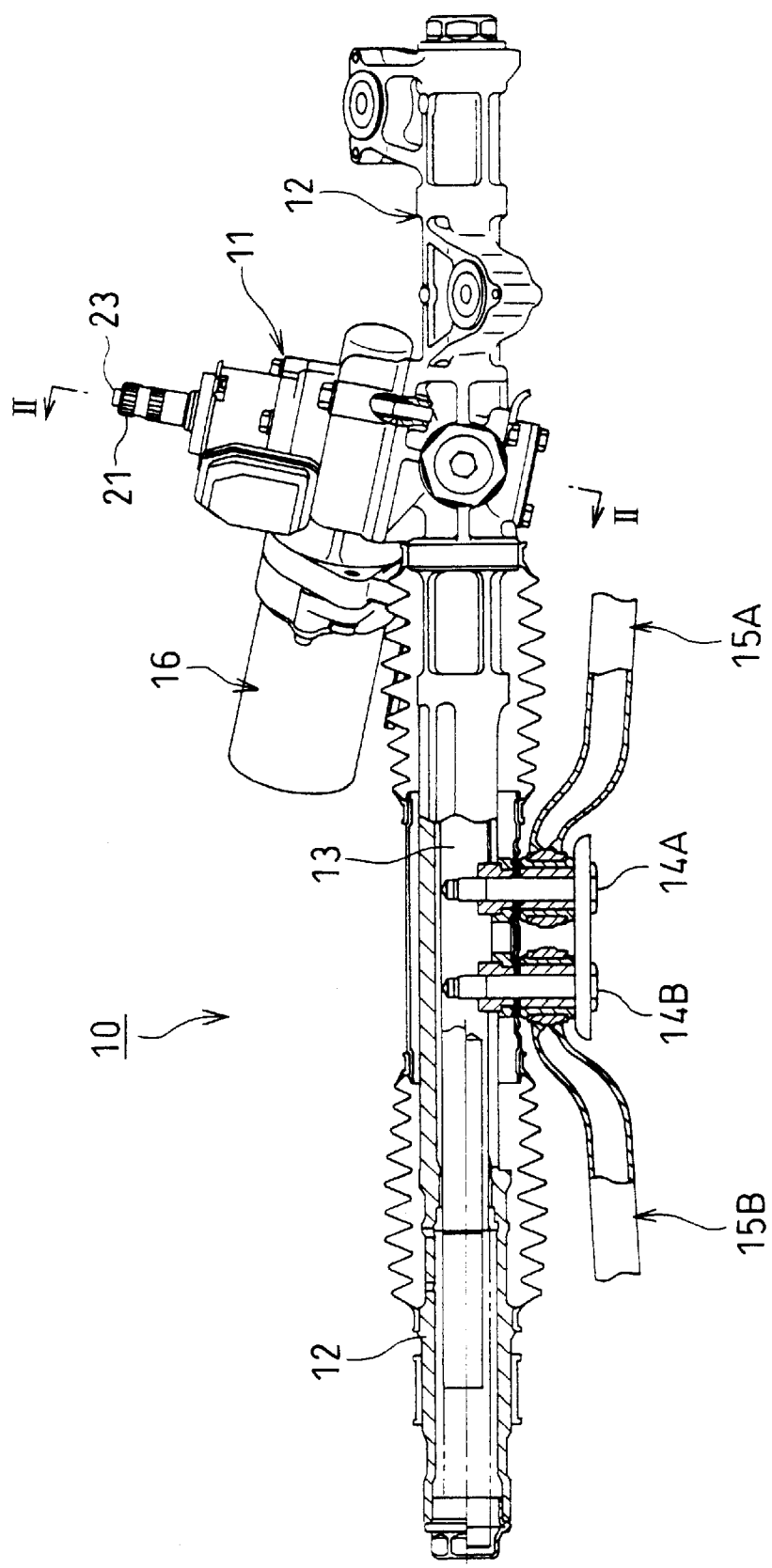
FIG. 1 is a front elevational view showing an electric power steering apparatus in a partly broken manner.

The electric power steering apparatus 10 is structured, as shown in FIG. 1, such that a column housing 11 connected to the steering wheel is connected to a gear box 12. Left and right tie rods 15A and 15B are connected to an intermediate portion of a rack 13 of the gear box 12 via connecting bolts 14A and 14B, thereby assisting a steering force of the steering wheel given by a driver by a motor 16 in a column housing 11 side.

As shown in FIG. 2, the column housing 11 separates the steering shaft to which the steering wheel is connected into an input shaft 21 and an output shaft 22, connects the input shaft 21 and the output shaft 22 therewithin by a torsion bar 23, and supports the input shaft 21 and the output shaft 22 to a housing 26 by a bearing 24 and bearings 25A and 25B. Further, the column housing 11 is provided in the housing 26 so as to surround a cylindrical core 28 which engages two detecting coils 27A and 27B constituting a torque sensor 20 with the input shaft 21 and the output shaft 22. The core 28 is provided with a vertical groove 30 engaging a guide pin 29 of the output shaft 22 so as to be movable only in an axial direction, and is provided with a spiral groove 32 engaging a slider pin 31 of the input shaft 21. Accordingly, when the steering torque applied to the steering wheel is applied to the input shaft 21 and a relative displacement in a rotational direction is generated between the input shaft 21 and the output shaft 22 due to an elastic torsional deformation of the torsion bar 23, the displacement in a rotational direction of the input shaft 21 and the output shaft 22 displaces the core 28 in an axial direction. Thus, an inductance of the detecting coils 27A and 27B due to a magnetic change in the periphery of the detecting coils 27A and 27B generated by the displacement of the core 28 changes. That is, when the core 28 moves toward the input shaft 21, the inductance of the detecting coil 27A to which the core 28 moves is increased. Conversely, the inductance of the detecting coil 27B from which the core 28 moves away is reduced. Accordingly, it is possible to detect the steering torque due to the change of the inductance.

Further, the output shaft 22 is structured such that an outer peripheral portion in an opposite side of the torque sensor 20 is set to a pinion 33 and the rack 13 of the gear box 12 mentioned above is engaged with the pinion 33. At this time, a cap 34 is screwed with the housing 26, and a rack guide 36 backed up to the cap 34 via a spring 35 supports a back surface of the rack 13.

Further, the column housing 11 supports the motor 16 mentioned above to the housing 26, supports a clutch connected to the motor 16 and a worm gear 38. The worm wheel 40 engaged with the worm gear 38 is fixed to an intermediate portion of the output shaft 22 mentioned above.

That is, in the electric power steering apparatus 10, drive current of the motor 16 is determined by vehicle speed sensor (not shown) and a control unit (not shown) which obtains a detected result of the torque sensor 20, in accordance with a predetermined assist force map. A drive force of the motor 16 constituting a suitable assist force in correspondence to the vehicle speed and the steering torque is applied to the output shaft 22. In this case, the clutch provided between the motor 16 and the worm gear 38 shuts the assist force when the assist is not required (during high speed operation).

Figure 3A:
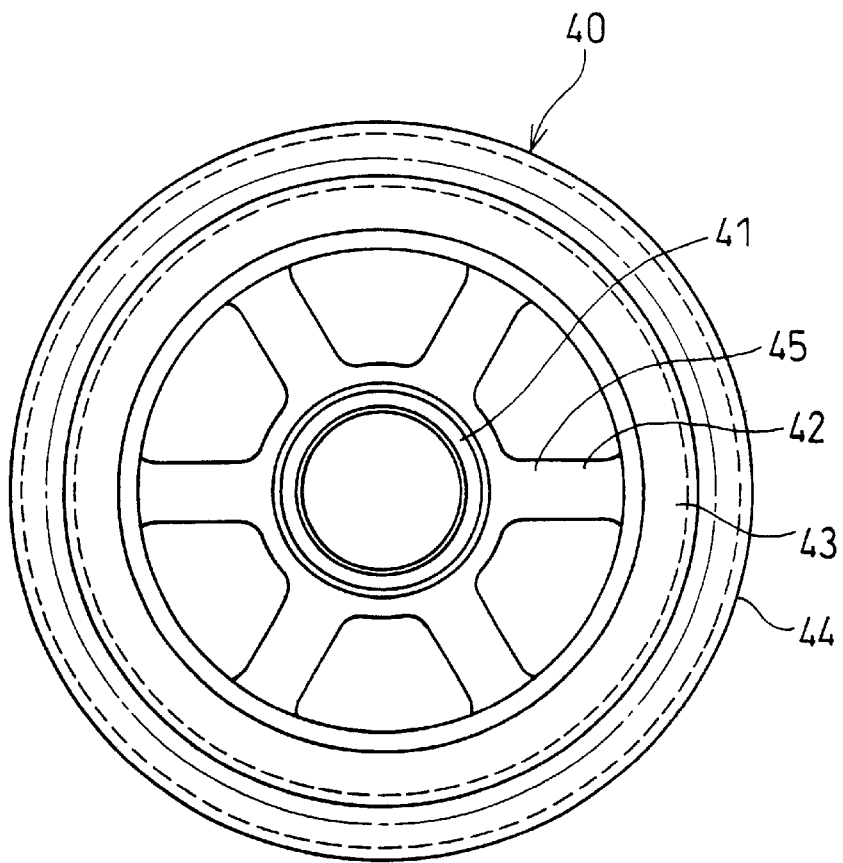
Figure 3B:
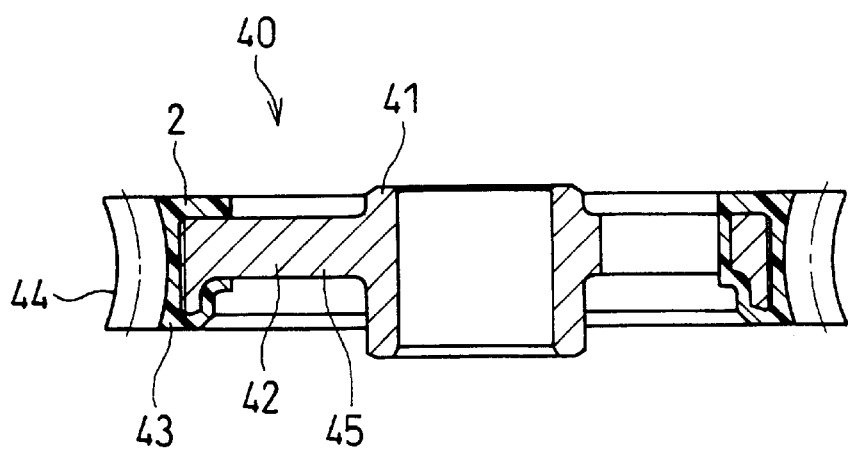

In this case, in the column housing 11, the worm wheel 40 for transmitting the drive force of the motor 16 to the output shaft 22 has a boss 41, a plurality of arms 42 radially extending from the boss 41 and a rim 43, as shown in FIGS. 3A and 3B, and is provided with teeth 44 on an outer peripheral surface of the rim 43. At this time, the worm wheel 40 is structured such that the boss 41, the arms 42 and the rim 43 are constituted by an insert metal fitting 45 so as to strengthen and the rim 43 provided with the teeth 44 is constituted by a resin so as to silence the engaging sound with the worm gear 38.

As to the resin constituting the rim 43, it is possible to employ a reinforced plastic such as a polyphthal amide resin (PPA), a polyamide resin (PA), a polyether ether ketone resin (PEEK) and a polyether nitryl resin (PEN) or the like in which a reinforcing fiber such as a carbon fiber, a glass fiber or the like is previously mixed.

Further, it is a matter of course that the resin in which the reinforcing fiber is not mixed, the polyphthal amide resin (PPA), the polyamide resin (PA), the polyether ether ketone resin (PEEK) and the polyether nitryl resin (PEN) can be employed for a resin constituting the rim 43 of the worm wheel having a low required strength, as they are.

As a metal constituting the insert metal fitting 45, it is possible to employ a sintered metal, a steel or the like.

A description will be given below of a method of producing the worm wheel 40 (FIGS. 4 to 8B).

The worm wheel 40 can be produced in accordance with the following steps (1) to (4).

Figure 4:
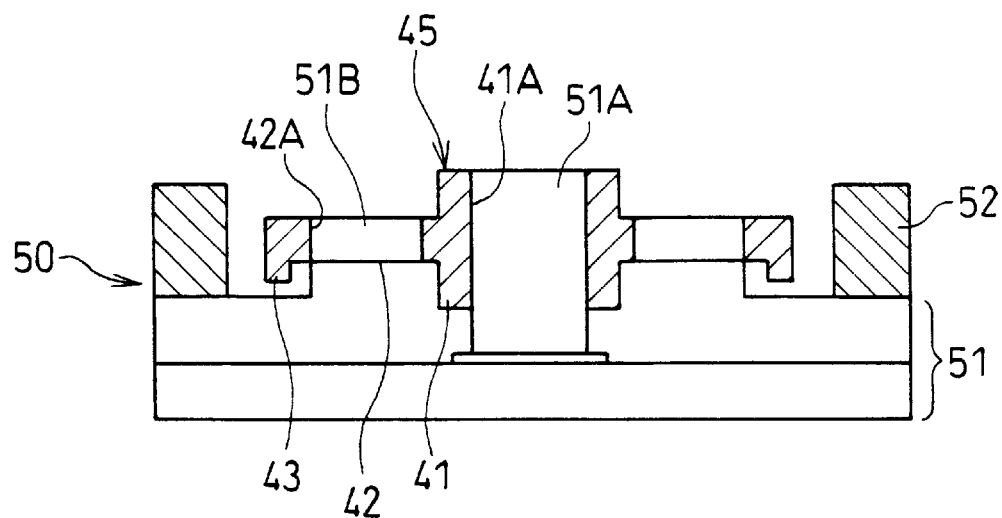
FIG. 4 is a cross sectional view showing an insert metal fitting setting step.

(1) The insert metal fitting 45 constituting the boss 41, the arms 42 and the rim 43 is fixed to a lower die 51 of a metal mold 50 (FIG. 4). The lower die 51 is provided with a boss hole fitting portion 51A fitted to a center boss hole 41A of the insert metal fitting 45, and an arm hole fitting portion 51B fitted to a plurality of arm holes 42A in the insert metal fitting 45. The metal mold 50 is structured such that a side die 52 disposed on an upper surface of the lower die 51 and an upper die 53 are jointed with each other so as to form a rim corresponding portion 54A in a cavity 54 around the insert metal fitting 45.

At this time, the upper die 53 is provided with a spool 55 in a center portion and is provided with a direct gate 56 expanding to an outer peripheral portion from the spool 55. The direct gate 56 is provided with a disc-like protruding portion 56A extending to a side of an outer peripheral surface of the side surface in the rim corresponding portion 54A of the cavity 54.

Figure 5:
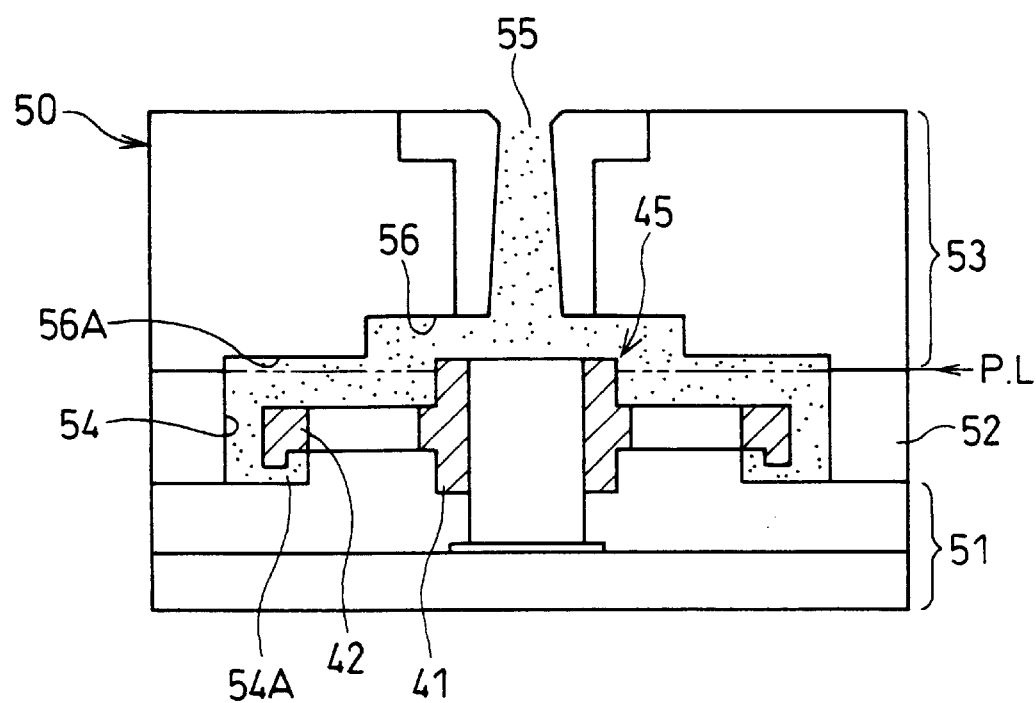
FIG. 5 is a cross sectional view showing an injection molding step.

(2) A molten resin is directly charged into the cavity 54 from the spool 55 provided in the center portion of the upper die 53 in the metal mold 50 by the direct gate 56 expanding to the outer peripheral portion so as to injection mold the molded product 1 (FIG. 5).

Accordingly, in the molded product 1, the resin rim layer 2 is formed in an outer periphery of the insert metal fitting 45 by the rim corresponding portion 54A of the cavity 54. The gate forming portion 3 extending to the outer peripheral surface side is formed on the side surface in the direct gate 56 side of the resin rim layer 2 by the disc-like protruding portion 56A of the direct gate 56.

Figure 6:
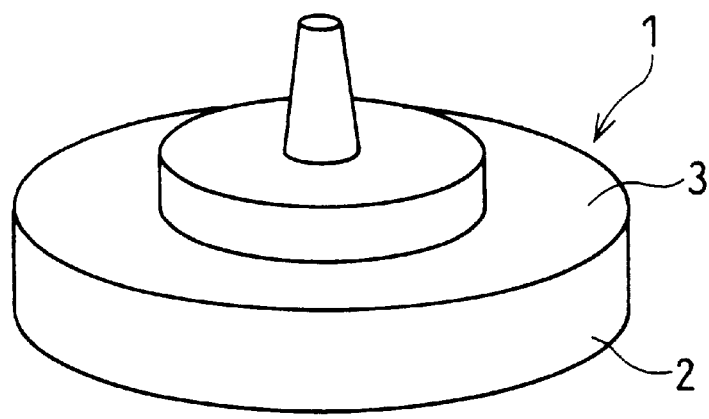
FIG. 6 is a perspective view showing a molded product.

(3) The molded product 1 cooled and solidified in the metal mold 50 is taken out from the metal mold 50 (FIG. 6).

Figure 7:
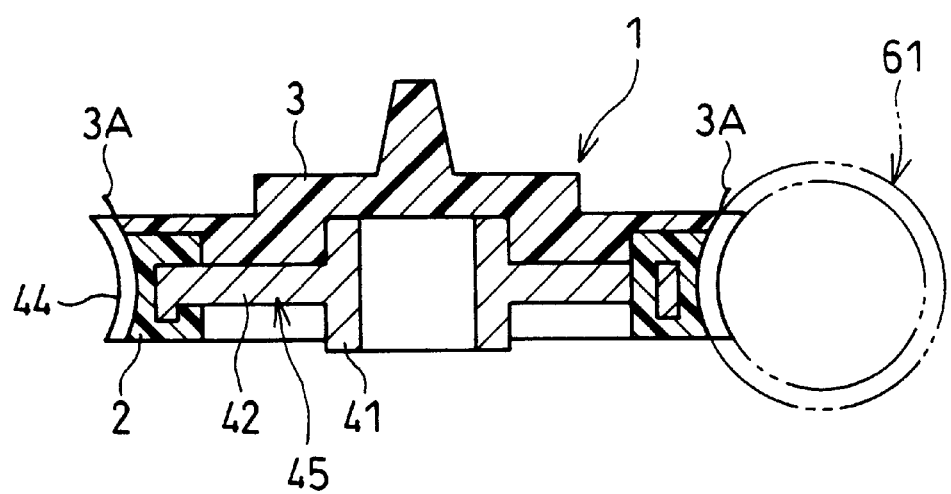
FIG. 7 is a cross sectional view showing a gear cutting step.

(4) A gear cutting in which a gear cutting direction is directed to a side of the gate forming portion 3 is applied to the outer peripheral surface of the resin rim layer 2 by using a cutter 61 of a hobbing machine or the like (FIG. 7). Accordingly, the teeth 44 are formed on the outer peripheral surface of the resin rim layer 2. At this time, the cutter 61 generates burrs 3A on the outer peripheral surface of the gate forming portion 3.

Figure 8A:
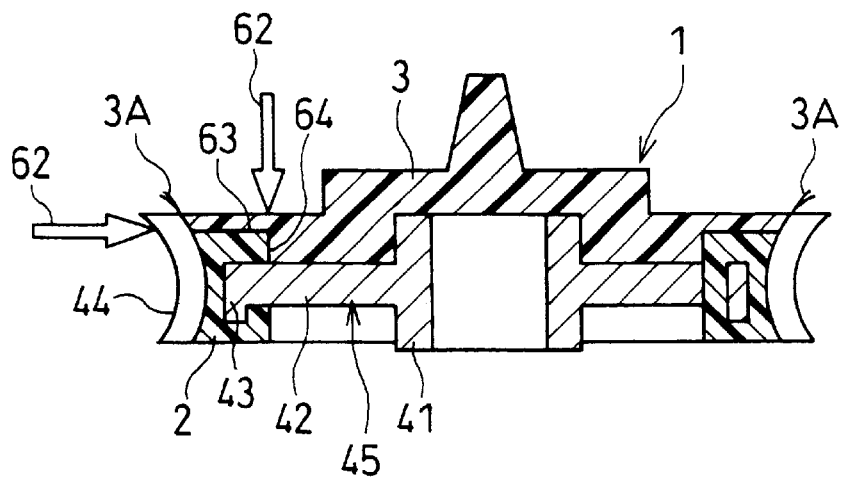
Figure 8B:
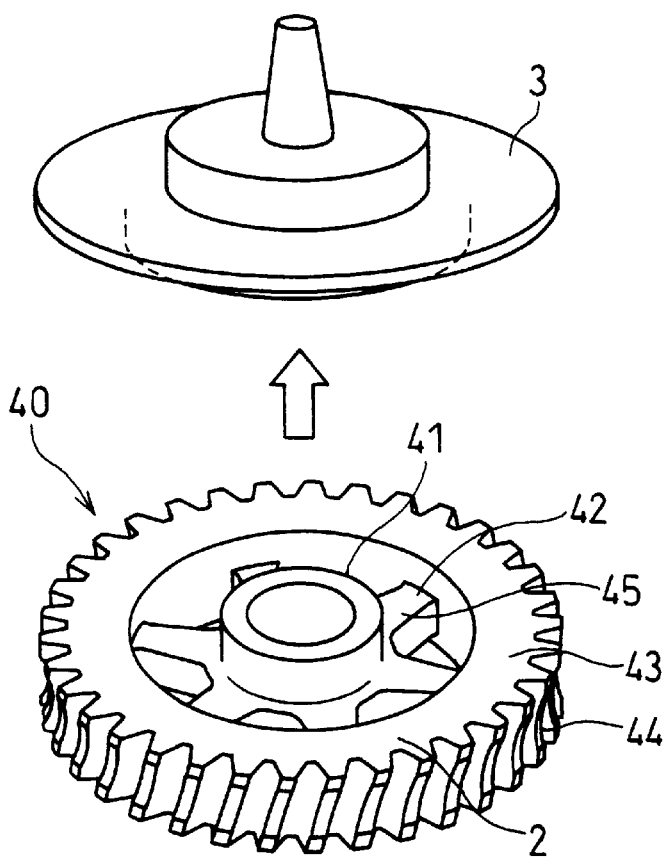

(5) By using a cutting blade 62 such as a lathe or the like, as schematically shown in FIGS. 8A and 8B, the molded product 1 is cut along a side surface of the resin rim layer 2 in the molded product 1 and an inner peripheral surface thereof (a plane-like boundary line 63 and a ring-like boundary line 64 with respect to the gate forming portion 3). The gate forming portion 3 is cut and removed from the molded product 1. The gate forming portion 3 cut along the boundary lines 63 and 64 by the cutting blade 62 is separated from the insert metal fitting 45 of the molded product 1. Accordingly, the worm wheel 40 provided with the teeth 44 on the outer peripheral surface of the rim 43 can be obtained in connection with the insert metal fitting 45 constituting the boss 41, the arms 42 and the rim Therefore, in accordance with the present embodiment, the following effects can be obtained.

(1) The burrs 3A generated at the gear cutting time can be simultaneously removed by cutting and removing the gate forming portion 3 including the side surface on the outer peripheral surface of the resin rim layer 2 after applying the gear cutting onto the outer peripheral surface of the resin rim layer 2. Accordingly, removing the burrs 3A generated at the gear cutting time is included to the cutting and removing step of the gate forming portion 3, so that it is possible to reduce the number of steps for producing the resin gear and it is possible to reduce cost.

(2) Since the gate forming portion 3 is formed on the side surface in the side of the direct gate 56 of the resin rim layer 2 and to at least the outer peripheral surface side, it is possible to secure a desired tooth width on the outer peripheral surface of the resin rim layer 2 after the gate forming portion 3 including the side surface of the resin rim layer 2 is cut and removed in accordance with the item (1) mentioned above.

As heretofore explained, embodiments of the present invention have been described in detail with reference to the drawings. However, the specific configurations of the present invention are not limited to the embodiments but those having a modification of the design within the range of the present invention are also included in the present invention. For example, the resin gear in accordance with the present invention is not limited to the structure in which a plurality of arms 42 constituted by the insert metal fitting 45 are radially branched, and the structure may be made such that an arm forms a disc shape continuously extending in a circumferential direction or the arms are provided with reinforcing ribs.

In accordance with the method of producing the resin gear, the structure is not limited to a direct gate type, and a pin point gate type may be employed.

Further, the present invention is not limited to the method of producing the worm wheel and can be applied to a method of producing the other gears such as a spur gear or the like.

As mentioned above, in accordance with the present invention, it is possible to reduce the number of steps for producing the resin gear and it is possible to reduce a cost.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A method of producing a resin gear comprising the steps of:

forming a resin rim layer on an outer periphery of an insert metal fitting from a gate of a metal mold;

forming a gate forming portion on a side surface in a gate side of the resin rim layer to at least the extent of an outer peripheral surface side;

cutting the gear in a direction toward the gate forming portion onto an outer periphery surface of the resin rim layer; and thereafter cutting and removing the gate forming portion.

2. A method of producing a resin gear according to claim 1, further comprising the steps of:

inserting an edge tool along a side surface in the gate side of the resin rim layer and cutting the gate forming portion in a first direction; and inserting the edge tool along an inner peripheral surface crossing the side surface of the resin rim layer and cutting the gate forming portion in a second direction.

* * * * *